US012439485B2

(12) United States Patent
Reed

(10) Patent No.: US 12,439,485 B2
(45) Date of Patent: Oct. 7, 2025

(54) ADJUSTABLE MICROWAVE OVEN MOUNTING APPARATUS

(71) Applicant: Latoya Danene Reed, Mobile, AL (US)

(72) Inventor: Latoya Danene Reed, Mobile, AL (US)

( * ) Notice: Subject to any disclaimer, the term of this patent is extended or adjusted under 35 U.S.C. 154(b) by 120 days.

(21) Appl. No.: 18/542,678

(22) Filed: Dec. 16, 2023

(65) Prior Publication Data

US 2024/0237164 A1 Jul. 11, 2024

Related U.S. Application Data

(60) Provisional application No. 63/387,852, filed on Dec. 16, 2022.

(51) Int. Cl.
*H05B 6/64* (2006.01)

(52) U.S. Cl.
CPC .................................. *H05B 6/6429* (2013.01)

(58) Field of Classification Search
CPC .................................................... H05B 6/6429
USPC .......................................................... 312/246
See application file for complete search history.

(56) References Cited

U.S. PATENT DOCUMENTS 1,303,697 A * 5/1919 McLaughlin ........ A47B 46/005 312/319.2
3,081,138 A * 3/1963 Stebbins ................ A47B 46/00 312/319.3
3,224,827 A * 12/1965 Foster .................. A47B 46/005 312/266
4,134,629 A * 1/1979 Hansen ................ A47B 46/005 312/273
4,453,690 A 6/1984 Takeuji
4,457,436 A * 7/1984 Kelley ................. A47B 95/008 312/246
4,666,113 A 5/1987 Itoh et al.
4,720,622 A * 1/1988 Iwata ...................... F24C 15/30 219/391

(Continued)

FOREIGN PATENT DOCUMENTS

CN 103244984 A 8/2013
CN 213931115 U 8/2021
KR 20070065133 A 12/2005

*Primary Examiner* — Muhammad Ijaz

(57) ABSTRACT

The present disclosure is an adjustable microwave oven mounting apparatus, suitable for mounting a microwave oven to a wall or to other surfaces and allows a microwave oven to be adjusted vertically and horizontally via a wireless remote control or an internet enhanced device. The disclosure consists of three major segments: a microwave oven mounting segment, an extending/contracting segment, and a wall mounting segment. The microwave oven mounting segment consists of brackets that are attached to the rear of a microwave oven which are then attached to the microwave oven mounting plate. The extending/contracting segment, which is situated between the microwave oven mounting segment and the wall mounting segment, consists of actuators and scissor hinges which allow the disclosure to extend and contract both vertically and horizontally. The wall mounting segment secures the adjustable microwave oven mounting apparatus to a wall or other fixed structures.

14 Claims, 19 Drawing Sheets

(56) References Cited

U.S. PATENT DOCUMENTS

| | | | | |
|---|---|---|---|---|
| 5,228,763 | A * | 7/1993 | Gingold | A47B 51/00<br>312/282 |
| 5,484,125 | A | 1/1996 | Anoszko | |
| 5,857,756 | A * | 1/1999 | Fehre | A47B 46/005<br>312/246 |
| 6,072,169 | A * | 6/2000 | Kang | H05B 6/6423<br>219/718 |
| 6,734,408 | B2 | 5/2004 | Shin | |
| D553,483 | S | 10/2007 | Grey | |
| 8,424,983 | B1 | 4/2013 | Strauss et al. | |
| 8,870,140 | B2 | 10/2014 | Stemple | |
| 9,004,430 | B2 | 4/2015 | Conner | |
| 9,358,167 | B2 | 6/2016 | Lapointe et al. | |
| 9,903,526 | B2 * | 2/2018 | Roberts | F16M 11/046 |
| 10,563,811 | B2 | 2/2020 | Pei | |
| 10,709,240 | B2 * | 7/2020 | Hira | A47B 77/08 |
| 10,935,180 | B1 | 3/2021 | Massey | |
| 2005/0173427 | A1 * | 8/2005 | Cho | H05B 6/6429<br>219/756 |
| 2010/0308615 | A1 * | 12/2010 | Miles | A47B 77/10<br>312/246 |
| 2014/0203692 | A1 * | 7/2014 | Marsters | A47B 46/005<br>312/246 |
| 2021/0243854 | A1 * | 8/2021 | Langford | H05B 6/6429 |
| 2022/0205192 | A1 * | 6/2022 | Crocker | E01C 23/0885 |
| 2022/0333787 | A1 * | 10/2022 | Langford | F24C 15/2021 |
| 2022/0356982 | A1 * | 11/2022 | Newville | F16M 11/2085 |
| 2022/0361714 | A1 * | 11/2022 | Nakamura | F24C 7/085 |
| 2022/0369809 | A1 * | 11/2022 | Oliver-Spivey | G10L 15/22 |
| 2024/0015859 | A1 * | 1/2024 | Park | H05B 6/6429 |
| 2024/0044357 | A1 * | 2/2024 | Yun | F16B 37/14 |
| 2024/0237164 | A1 * | 7/2024 | Reed | H05B 6/6429 |
| 2024/0298387 | A1 * | 9/2024 | Guo | F24C 15/08 |
| 2024/0314896 | A1 * | 9/2024 | Trice | H05B 6/1236 |

* cited by examiner

ADJUSTABLE MICROWAVE OVEN MOUNTING APPARATUS

CROSS REFERENCE TO RELATED APPLICATION

The present application claims the benefit of U.S. provisional application Ser. No. 63/387,852, filed on Dec. 16, 2022, which is hereby incorporated herein by reference in its entirety.

TECHNICAL FIELD OF THE INVENTION

The disclosed invention relates to the general field microwave oven appliances, more specifically to the technical field of microwave oven accessories, and particularly relates to an adjustable apparatus for mounting a microwave oven to a wall or to other surfaces. The present disclosure can also be used to mount a display or other electronic device to a wall or other surfaces.

BACKGROUND OF THE INVENTION

The present invention is an adjustable microwave oven mounting apparatus and will be referred to as such throughout this document. Herein, the background of the subject matter is discussed is some detail, which includes identifying specific challenges that users could potentially face in using microwave ovens and how the present disclosure could possibly solve these challenges.

Over-the-range microwave ovens were created to free up counterspace in the kitchen to provide a more organized and neat appearance. However, this resolution also created another problem: many users may find it difficult to reach microwave ovens for cooking and to clean because over-the-range microwave ovens are located in a relatively high position. Adults who are short in stature, the elderly with limited mobility, children, and those with certain physical disabilities are among the users who typically find it difficult to reach an over-the-range microwave oven. Conversely, microwave ovens that are located in relatively low positions, such as underneath a kitchen's countertop, also pose a problem. Users who are elderly, tall in stature, or those who have physical disabilities may find it quite difficult to stoop or reach below in order to operate or clean a microwave oven. These disadvantages originate from the fact that all microwave ovens, whether over-the-range, under-the-counter, built-in, etc., are stationary kitchen appliances. Therefore, it is impossible to adjust microwave ovens according to the user's preferred level for optimal accessibility.

The challenges of accessing microwave ovens for heating foods and beverages and challenges to clean these small appliances have the possibility of creating hazards for the microwave oven user. Due to the stationary locations of microwave ovens, whether located above (i.e., over-the-range) or below (i.e., under-the-counter) ideal positions, users are now exposed to possible hazardous conditions. Those users who may find it difficult to reach microwave ovens often resort to using step stools, ladders, chairs, or even stooping and overextending their bodies. Using stools, ladders, and chairs to reach microwave ovens that are positioned at a higher level, can be hazardous with a great possibility of a user losing his or her balance and falling. On the other hand, users who use microwave ovens positioned at lower levels, typically resort to stooping and overextending their bodies in a downward position, which can have ergonomic risks including awkward posture and stressing of the muscles and tendons that could even lead to injuries in extreme cases. These ergonomic risks are also possible when users overextend their bodies in an upward position to access microwave ovens located in a relatively high position. Moreover, users who experience difficulty in accessing a microwave oven, could also be exposed to possible burn hazards. Reaching for hot foods and liquids has the potential of spilling onto the user's face, chest, hands, etc., causing sometimes severe scalding and burns.

The problems, as described above in this document, can be resolved by the present disclosure, primarily due to its adjustable features. Because microwave ovens are stationary kitchen appliances, they cannot be adjusted. Even prior arts of other microwave oven mounting systems only allow a microwave oven to be mounted and remain stationary, without any options for a microwave oven to be adjusted. The disclosed subject matter not only allows a microwave oven to be mounted to a wall or other surfaces, but the present invention also allows a microwave oven to be adjusted to optimal levels, thereby creating greater accessibility for users to properly reach a microwave oven without resorting to other methods (i.e., using ladders and step stools or overextending the body) that could potentially threaten the safety of the user. The disclosed invention is securely bolted to a wall or to a surface and a microwave oven is then positioned onto the adjustable microwave oven mounting apparatus via bolting the rear of the microwave oven onto the mounting apparatus. The present disclosure embodies an extending/contracting segment, consisting of actuators and scissor hinge mechanisms, that allows the adjustable microwave oven mounting apparatus to maneuver a microwave oven away from and towards a wall or surface. This invention is also able to maneuver a microwave oven upward and downward from its original position. The adjustability of the present disclosure is controlled by using a remote control or an internet enhanced device, whereas the user can easily adjust the adjustable microwave oven mounting apparatus, and thus an attached microwave oven, to the user's position of choice.

The current challenges that users face in reaching these relatively high and low-positioned microwave ovens oftentimes deter many users from cleaning their microwaves ovens thoroughly and regularly. Microwave ovens can pose a health risk for transmitting illnesses and germs if they are not cleaned on a regular basis. Dirty microwaves can potentially catch fire as food particles build up from spills. The buildup of food particles can also lead to a less efficient microwave oven, which leads to foods and liquids not being heated properly. Therefore, the user will need to use a microwave oven longer than normal to heat foods and liquids, thereby causing an increase in energy consumption. Furthermore, not frequently cleaning microwave ovens could also reduce the life of microwave ovens. However, due to its adjustability features, the present subject matter is able to cure these challenges mentioned above by enabling the user to conveniently clean the microwave oven more often, which will, in turn provide the following advantages: decrease the spread of germs and illnesses, decrease the consumption of energy, and extend the life of microwave ovens, thereby, helping to keep the health of the user intact, saving the user money on their electricity bill, and further saving the user additional money by not having to purchase microwave ovens more frequently.

Additionally, prior arts of other microwave oven mounting systems that are available are relatively difficult to install and time-consuming. Therefore, users tend to hire a professional contractor to perform the job. These installations can be quite expensive, costing hundreds of dollars. The present invention will make installation relatively easier and less time consuming, whereas the users, themselves, can install this adjustable microwave oven mounting apparatus without having to pay costly installation fees. Moreover, prior arts are usually specific to each microwave oven brand or microwave type. Therefore, with each upgrade or replacement of a microwave oven, the user will have to purchase a new microwave oven mounting kit. However, the disclosed subject matter is a universal, adjustable microwave oven mounting apparatus, created to fit virtually any microwave oven. Subsequently, the user is able to upgrade or replace a microwave oven, despite its brand or type, without having to purchase a new mounting kit, thereby, being able to keep and use the present invention with any microwave oven upgrade or replacement.

BRIEF DESCRIPTION OF INVENTION

Brief Description of Selected Alternatives and Variations of the Invention

Figure 8:
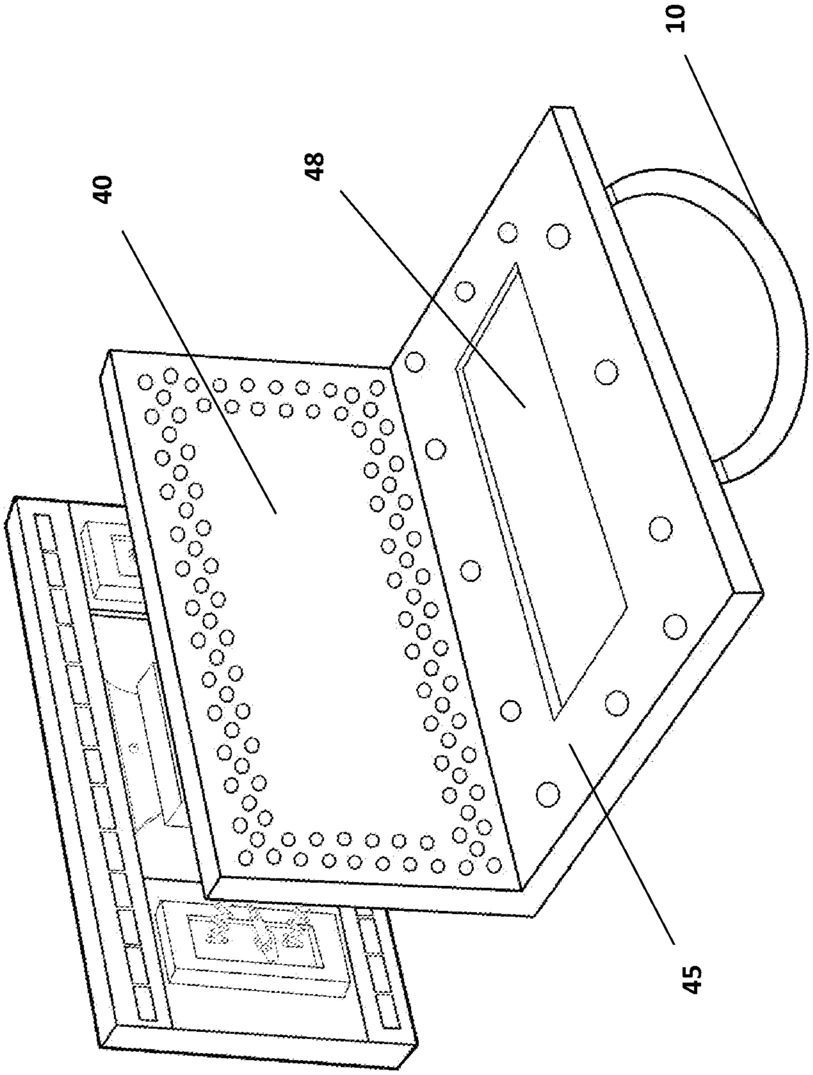

FIG. 8 is a diagram of a three-dimensional structure of an alternate embodiment of the present subject matter.

Figure 9:
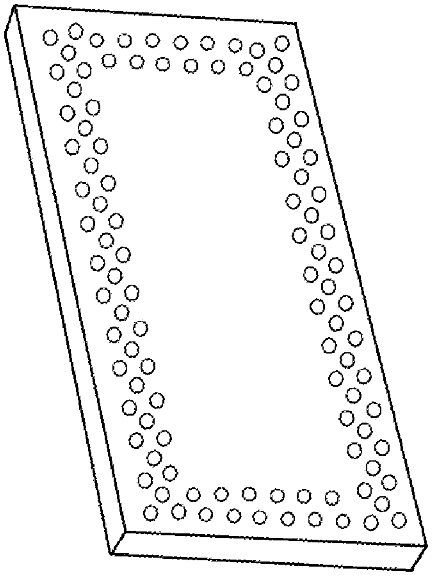

FIG. 9 is a diagram of a three-dimensional structure of an alternate embodiment of the microwave oven mounting brackets as described in the preferred embodiment of the present subject matter.

Figure 10:
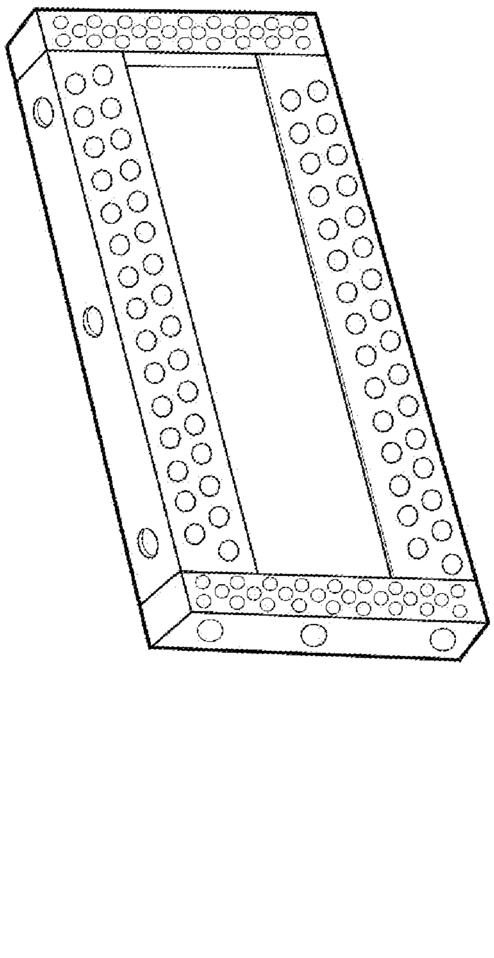

FIG. 10 is a diagram of a three-dimensional structure of an alternate embodiment of the microwave oven mounting brackets as described in the preferred embodiment of the present subject matter.

Figure 11:
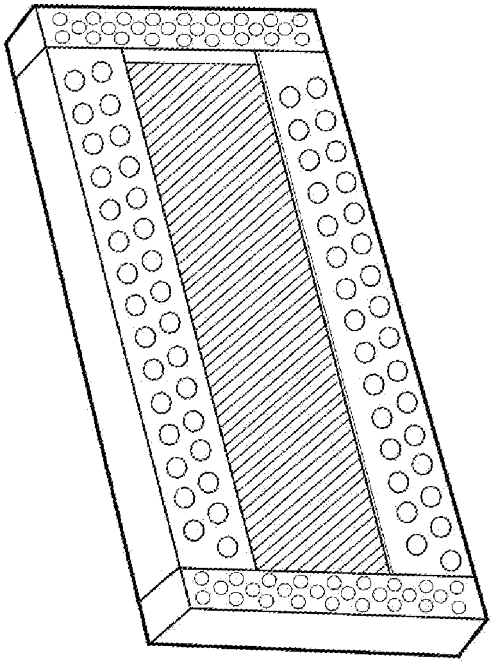

FIG. 11 is a diagram of a three-dimensional structure of an alternate embodiment of the microwave oven mounting segment as described in the preferred embodiment of the present subject matter.

Figure 12:
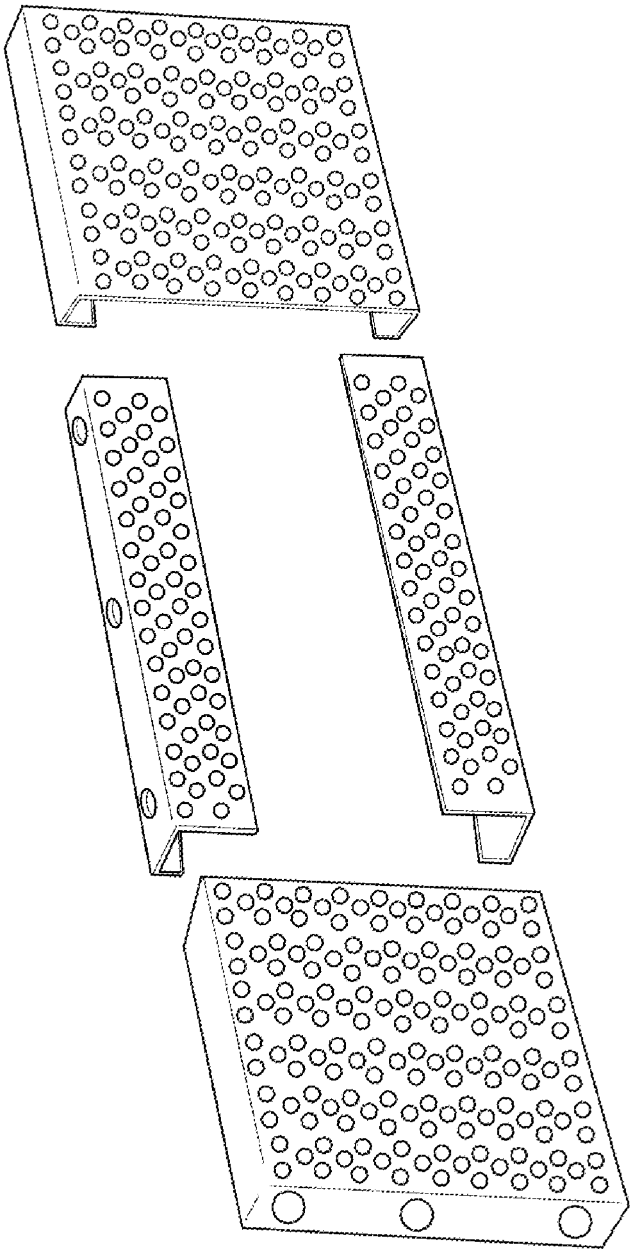

FIG. 12 is a diagram of a three-dimensional structure of an alternate embodiment of the microwave oven mounting brackets as described in the preferred embodiment of the present subject matter.

Figure 13:
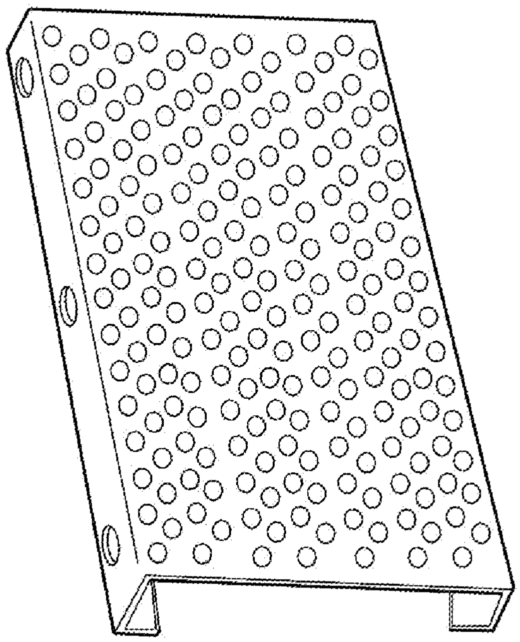

FIG. 13 is a diagram of a three-dimensional structure of an alternate embodiment of the microwave oven mounting brackets as described in the preferred embodiment of the present subject matter.

Figure 14:
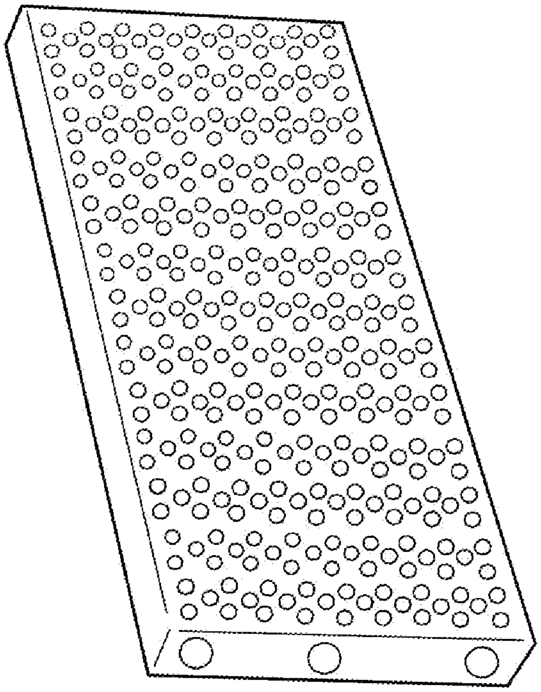

FIG. 14 is a diagram of a three-dimensional structure of an alternate embodiment of the microwave oven mounting brackets as described in the preferred embodiment of the present subject matter.

Figure 15:
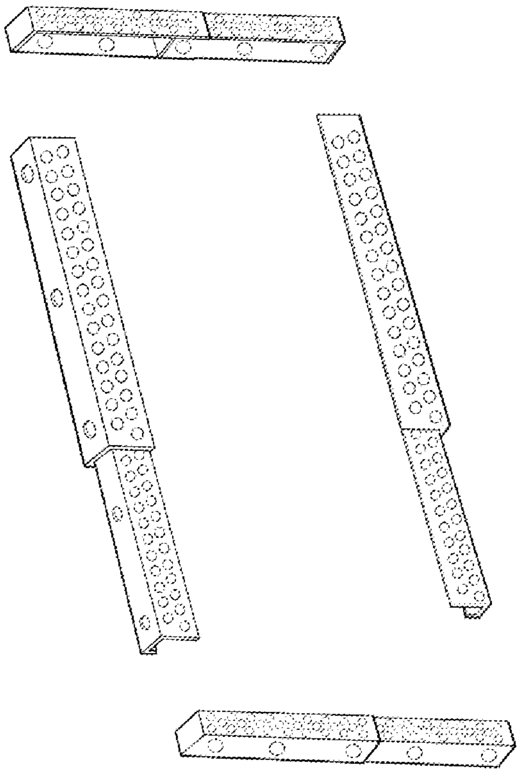

FIG. 15 is a diagram of a three-dimensional structure of an alternate embodiment of the microwave oven mounting brackets as described in the preferred embodiment of the present subject matter in a partially extended configuration.

Figure 16:
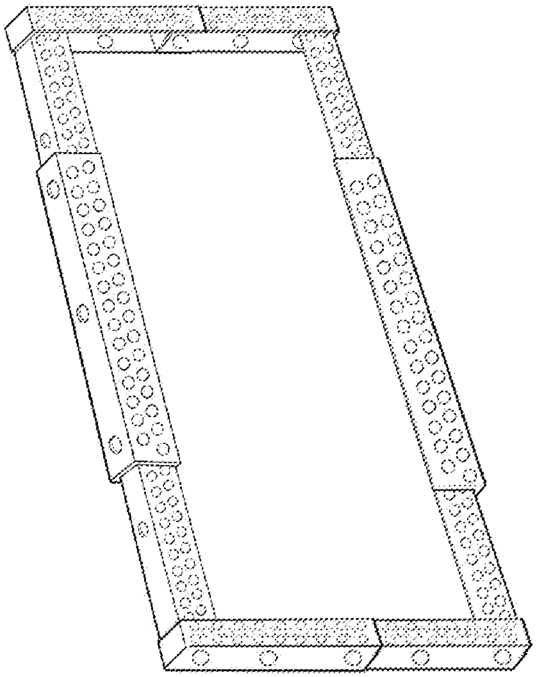

FIG. 16 is a diagram of a three-dimensional structure of an alternate embodiment of the microwave oven mounting brackets as described in the preferred embodiment of the present subject matter in an extended configuration.

Figure 17:
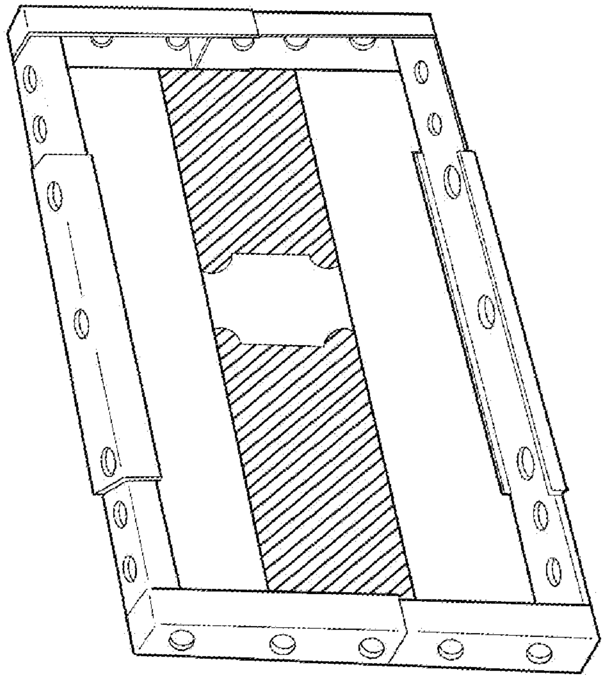

FIG. 17 is a diagram of a three-dimensional structure of an alternate embodiment of the microwave oven mounting plate as described in the preferred embodiment of the present subject matter in a partially extended configuration.

Figure 18:
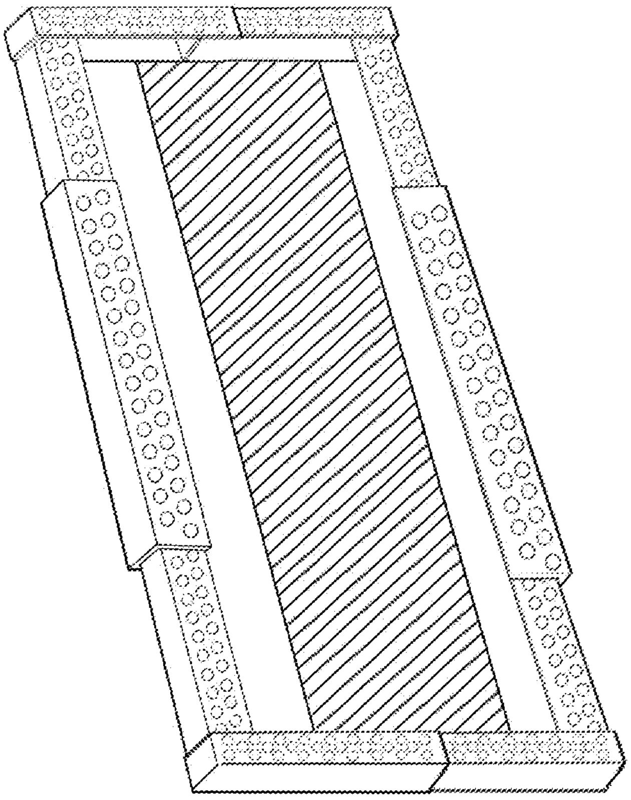

FIG. 18 is a diagram of a three-dimensional structure of an alternate embodiment of the microwave oven mounting brackets as described in the preferred embodiment of the present subject matter in an extended configuration.

Figure 19:
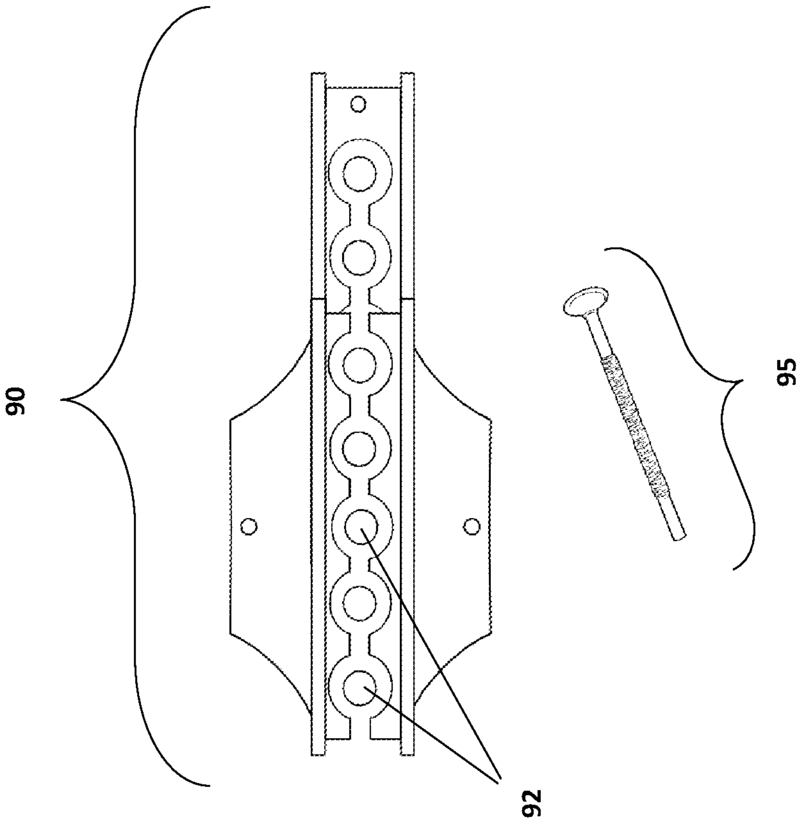

FIG. 19 is a three-dimensional structure of an alternate embodiment of the described preferred embodiment of the present subject matter, which consists of two additional components.

DETAILED DESCRIPTION OF THE INVENTION

In this document, the invention is described in some detail. However, it should be understood that the preferred embodiment used to describe the invention was created as an example only and should not be limited to any particular embodiment. The terminology that is used in this document is only for the purpose of describing the preferred embodiment that is depicted herein and is not intended to limit the scope of the invention. The preferred embodiments may have alternatives, variations, and changes without deviating from the subject matter, since the scope of this invention will be limited only by formal claims, which are not included in this document.

In this section of the document, various aspects of the present invention can be further comprehended as it will be described more clearly and completely hereinafter with reference to the accompanying drawings. It should also be understood that these drawings are not necessarily drawn to scale but are included in this document only for the purpose of describing the disclosed subject matter and are not intended to limit the scope of the invention. Unless otherwise indicated in the drawings or in the description, the left and right sides of the subject matter are mirror images and identical.

The present disclosure is an adjustable microwave oven mounting apparatus, suitable for mounting a microwave oven to a wall or to other surfaces, especially over a range, stove, or cooking top, under a kitchen counter or cabinet, or around other objects and obstacles, while allowing the user to adjust a microwave oven vertically and horizontally via remote control or internet enhanced devices. The disclosed invention is universal, meaning that this mounting apparatus can mount and adjust virtually any microwave oven that is available, including but not limited to, over-the-range microwaves, low-profile microwaves, countertop microwaves, under-counter microwaves, and convection microwave ovens. Ideally, the material for which the disclosed subject matter is to be made up of is reinforced steel, which has the capacity to properly uphold microwave ovens of at least 75-125 pounds (which is roughly the weight for virtually any type of microwave oven). However, other alternative materials such as aluminum, metal, etc. can be substituted for reinforced stainless steel that has the capacity to uphold microwave ovens.

In the following section, the disclosed subject matter is described in more detail by referencing the drawings provided. Many aspects of the subject matter are described more thoroughly by referencing the correlating numbers shown in the illustrations of the embodiment of the invention. These illustrations only depict certain selected embodiments of the subject matter and are not intended to limit the scope of the present disclosure. It should be understood that in describing the present invention, there are numerous versions, methods, and steps, alternatives, and variations, that can be stated. However, for the sake of brevity, this document will refrain from stating and describing each version, method, step, alternative, and variation.

Figure 1:
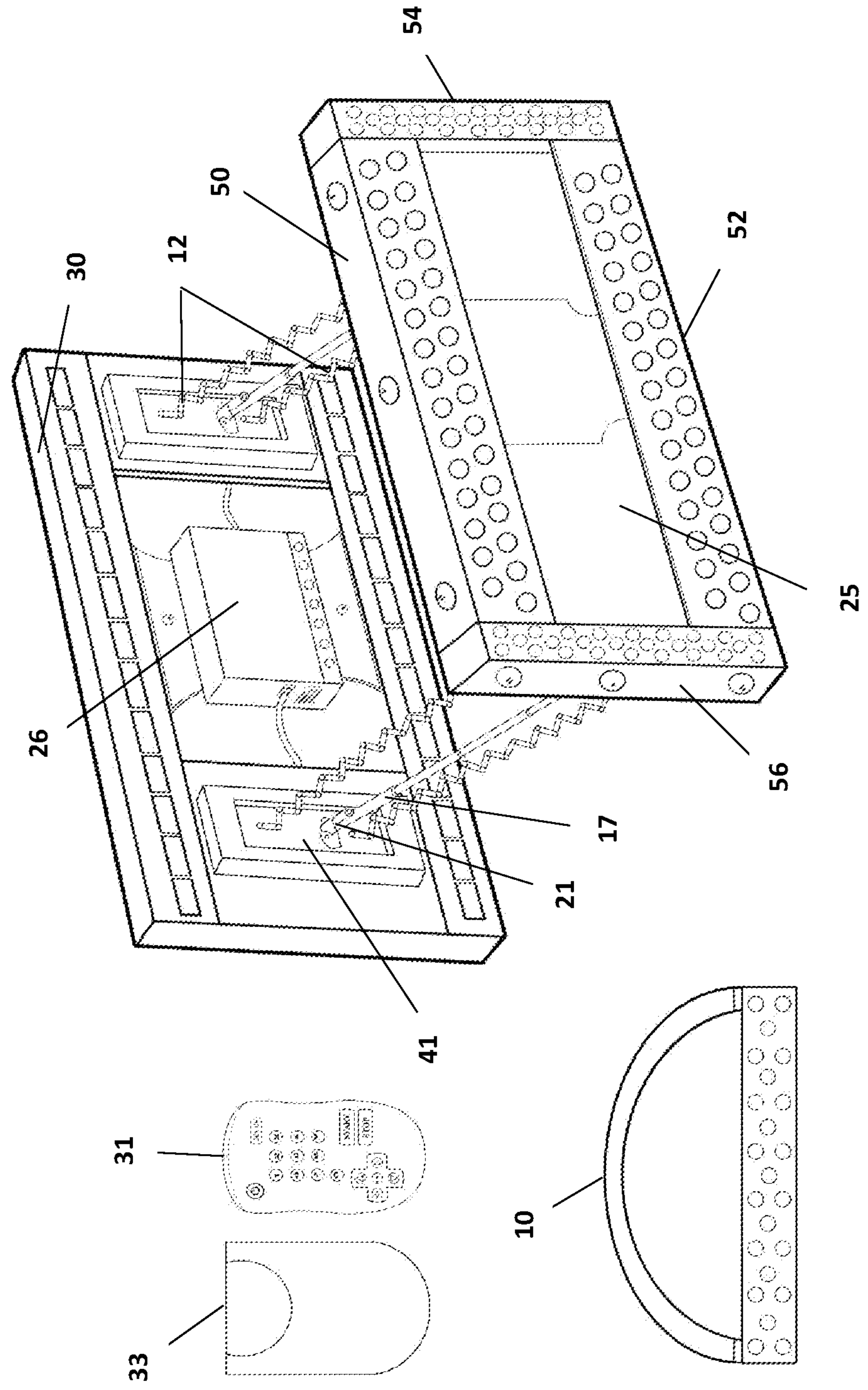
FIG. 1 is a three-dimensional view of the preferred embodiment of the present subject matter.

FIG. 1 is a three-dimensional view of the preferred embodiment of the present subject matter. The adjustable microwave oven mounting apparatus consists of three major segments: a microwave oven mounting segment, an extending/contracting segment, and a wall mounting segment. The microwave oven mounting segment includes four mounting brackets 50, 52, 54, 56 and a microwave oven mounting plate 25. These four mounting brackets include an upper bracket 50, lower bracket 52, left bracket 54, and a right bracket 56 which are attached to the rear of the microwave oven's upper, lower, left, and right sides, respectively. The mounting brackets 50, 52, 54, 56 can be used in any combination in order to attach to and accommodate virtually any microwave oven, thus, giving the adjustable microwave oven mounting apparatus its universal feature.

After the mounting brackets 50, 52, 54, 56 are attached to the rear of the microwave oven, they are then attached to the microwave oven mounting plate 25. The mounting plate 25 is used to support the mounting brackets 50, 52, 54, 56, and thus, the microwave oven, onto the adjustable microwave oven mounting apparatus. There are numerous screw holes located on the four mounting brackets 50, 52, 54, 56 that are used to attach to the rear side of the microwave oven and to also attach onto the microwave oven mounting plate 25. The variety of microwave ovens available today have a very limited amount of screw holes, all located in various positions on the rear side of the microwave ovens. Therefore, the mounting brackets 50, 52, 54, 56 are designed with numerous screw holes in order to attach to and to accommodate virtually any microwave oven. The microwave oven mounting plate 25 also has screw holes located on its upper, lower, left, and right sides in order for the four mounting brackets (the upper bracket 50, lower bracket 52, left bracket 54, and right bracket 56) to attach, respectively.

The extending/contracting segment of the adjustable microwave oven mounting apparatus consists of two telescopic linear actuator mechanisms 17 that are located on the left and right side of the invention and are attached between the microwave oven mounting plate 25 and the wall mounting segment 30. The two telescopic linear actuators 17 are the mechanical components of the invention that are responsible for moving the microwave oven. These actuators 17 enable the invention to maneuver the microwave oven by extending out exceptionally longer from a compacted and contracted length. The actuators 17 have compacted rods that are able to extend out into greater lengths and contract back into the actuators 17. The actuators 17 provide horizontal mobility to the adjustable microwave oven mounting apparatus which moves the microwave oven away from and towards the wall. The actuators 17 provide vertical mobility to the adjustable microwave oven mounting apparatus which lifts and lowers microwave ovens.

Moreover, the extending/contracting segment is also comprised of scissor hinge mechanisms 12 that are located above and below each actuator 17 and are attached to the front end of the wall mounting segment 30 and to the rear end of the microwave oven mounting plate 25. One of the functions of the scissor hinges 12 is to provide additional support to the adjustable microwave oven mounting apparatus. The scissor hinge mechanisms 12 also work in conjunction with the actuators 17 to help provide vertical and horizontal movement to the invention, and thus to the microwave oven. The scissor hinges 12 are primarily guided by the actuators 17. As the actuators 17 move vertically and horizontally, the scissor hinges 12 move along with them in the same directions, helping to pivot the microwave oven mounting segment and, thus, a microwave oven around obstacles.

The subject matter is motor-driven and electrically powered. For the actuators 17 to move the adjustable microwave oven mounting apparatus, there is a motor 21 attached to the actuators 17 that are electrically powered. The extending/contracting segment also has a controller 26 which is essentially an electronic system equipped with a power supply adapter that regulates the operation of the actuators 17 which are plugged into the controller 26. Optionally, actuators could be wireless.

This figure depicts a wireless remote control 31 that is configured for sending signals to the controller 26 to control the operation of the adjustable microwave oven mounting apparatus. Optionally, the remote control 31 can be programmed to operate the microwave oven as well. The remote control 31 is accompanied by a remote control pouch 33 that holds the remote control 31. The remote control pouch 33 can hang from or attach to surfaces, such as the surface of the microwave oven itself, at the user's discretion. When the remote control pouch 33 is securely attached to a surface, the remote control 31 is placed inside the remote control pouch 33 to protect the remote control 31 and for the user to be able to quickly have access to the remote control 31 due to its convenient location. In addition to the remote control 31, there will also be an option for the adjustable microwave oven mounting apparatus to be controlled using smart home automation or internet enhanced device (e.g. IoT devices). For example, to control the adjustable microwave oven mounting apparatus, the user can use a cell phone, computer, tablet/pad, etc. with internet access. The adjustable microwave oven mounting apparatus can also be controlled using voice command systems, such as Google Assistant or Amazon Alexa.

There is also a pull handle 10 that manually controls the extending/contracting segment and is not directly attached to the adjustable microwave oven mounting apparatus, but rather attaches to the microwave oven, preferably underneath the microwave oven. The lower portion of the pull handle 10 contains screw holes that allows the pull handle 10 to bolt underneath a microwave oven. Since the pull handle 10 to be positioned underneath a microwave oven, especially when placed underneath an over-the-range microwave oven, it can be exposed to high temperatures if it placed directly above a range or a cooking top. Therefore, the ideal material for the described pull handle 10 is thermoplastic polyphthalamide (PPA, a high-performance polyamide), reinforced with fiberglass, capable of withstanding high heat temperature. FIG. 1 depicts an unattached pull handle 10. Though the adjustable microwave oven mounting apparatus includes a remote control 31 to control its movement, the pull handle 10 serves as a contact point to manually control the movement of the adjustable microwave oven mounting apparatus and, thus, an attached microwave oven in the desired direction. This option of manual control is very useful especially if ever the adjustable microwave oven mounting apparatus requires maintenance or if ever there is a loss of power.

The wall mounting segment includes a wall mounting segment 30 that secures the adjustable microwave oven mounting apparatus to a wall or other fixed structures. The wall mounting segment 30 is bolted onto a wall, preferably using wall studs, in order to provide stability in securing the microwave oven on the adjustable microwave oven mounting apparatus. There are several safety screw holes located on the wall mounting segment 30 that enables wall mounting segment 30 to attach to the wall via bolting. Alternative to using wall studs, heavy duty drywall anchors and other types of fastener and anchoring systems could be used, preferably those that are capable in upholding the adjustable microwave oven mounting apparatus along with the weight of the microwave oven.

Figure 2:
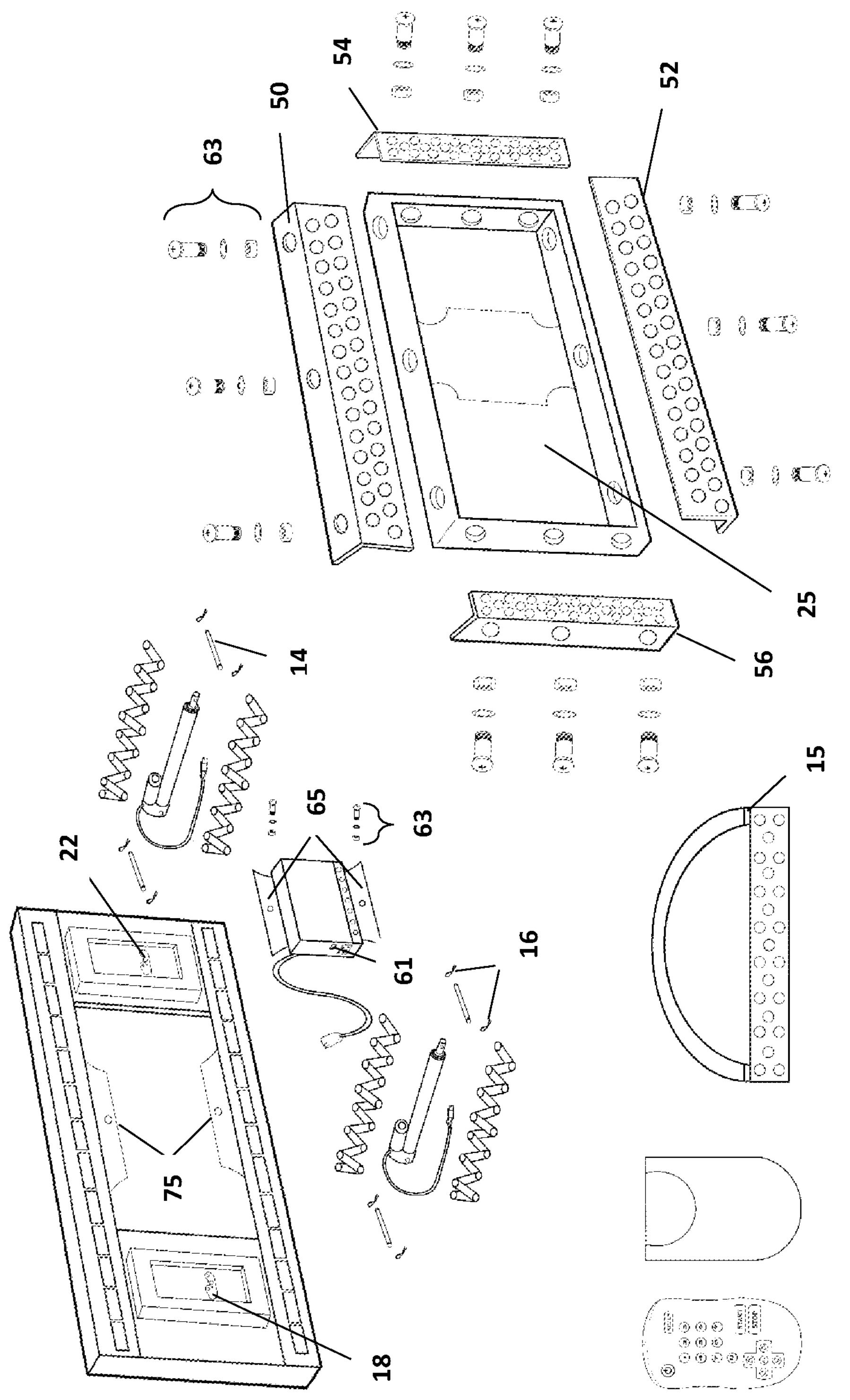
FIG. 2 is an exploded view of an adjustable microwave oven mounting apparatus according to an embodiment of the present invention.

FIG. 2 is an exploded view of an adjustable microwave oven mounting apparatus according to an embodiment of the present invention. In this drawing, the actuators 17 are shown detached from the controller 26, showing an actuator port 61 on the controller 26 into which the actuator's 17 cord end connects. This illustration shows a side view of the controller 26 that is identical to its opposite side. The present disclosure also consists of a Clevis fastener system 14, 16, 18 which is depicted more clearly in this illustration. The telescopic linear actuators 17 have a Clevis fastener system 14, 16, 18, consisting of a Clevis pin 14, an R-clip 16, and a Clevis mount 18 that is located on the front and rear end of each actuator 17. The purpose of this particular fastener system 14, 16, 18 is to anchor the actuators 17 onto the adjustable microwave oven mounting apparatus. More specifically, the Clevis pins 14 on the front end of the actuators 17 are secured to the rear end of the microwave oven mounting plate 25 and the Clevis pins 14 on the rear end of the actuators 17 are secured to the front end of the wall mounting segments 30 by using a Clevis mount 18. The R-clips 16 are then inserted into both ends of the Clevis pin's 14 grooves to secure the Clevis pin 14 and, thus, the actuator 17 on the Clevis mount 18. Another important purpose of the Clevis fastener system 14, 16, 18 is to provide movement to the actuators 17 in which the Clevis pin 14 allows the actuator 17 to swivel over 180 degrees. Specifically, the Clevis fastener system 14, 16, 18 on the ends of each actuator 17 will allow each actuator 17 to pivot horizontally. To exemplify, the Clevis fastener system 14, 16, 18 enables the actuators 17 to pivot out of the ed compartments 44 and down away from the wall, where then the actuators 17 can extend out their rods from a contracted position. The Clevis fastener system 14, 16, 18 also enables the actuators 17 to pivot back into the wall mounting segment's 30 hollowed compartments 44 in an upright position whenever the actuators 17 are not in use. Additionally, this drawing shows actuator cord passages 22 which are holes/openings located in the middle of each Clevis mounts 18 that penetrates through the wall mounting segment 30 as well. The actuator cord passages 22 allow the cord on each of the actuators 17 to go through the Clevis mount 18 and to rear of the wall mounting segment 30 to connect into the controller port 61.

In this view, the microwave oven mounting plate 25 is seen more clearly, whereas the four mounting brackets 50, 52, 54, 56 are shown detached from the microwave oven mounting plate 25, showing where each of the four mounting bracket 50, 52, 54, 56 will attach to each side of the microwave oven mounting plate 25 via bolting. The left mounting bracket 54 and right mounting bracket 56 are mirror images of each other, which attach to the left and right sides of the microwave oven mounting plate 25, respectively. The upper mounting bracket 50 and lower mounting bracket 52 are also mirror images of each other and attach to the upper and lower sides of the microwave oven mounting plate 25, respectively. Ideally, a bolt, a washer, and a nut fastener system 63, are used to fasten together the mounting brackets 50, 52, 54, 56 to the microwave oven mounting plate 25.

This figure depicts two controller wings 65 located on the controller 26. Each controller wing 65 consists of a screw hole that are used to attach the controller 26 to the wall mounting segment 30 via bolting. The wall mounting segment 30 also has wings (wall mounting segment wings 75) which the controller wings 65 align and then are fastened together. Since the controller 26 can attach to the wall mounting segment 30, it can also detach from the wall mounting segment 30 by means of unbolting. This detachable feature helps whenever maintenance of the controller 26 is necessary. The controller 26 in this drawing is not attached to the wall mounting segment 30. However, in FIG. 1, for example, the controller 26 is shown bolted to the wall mounting segment 30. Ideally, a bolt, a washer, and a nut fastener system 63, are used to fasten together the controller 26 to the wall mounting segment 30.

Figure 3:
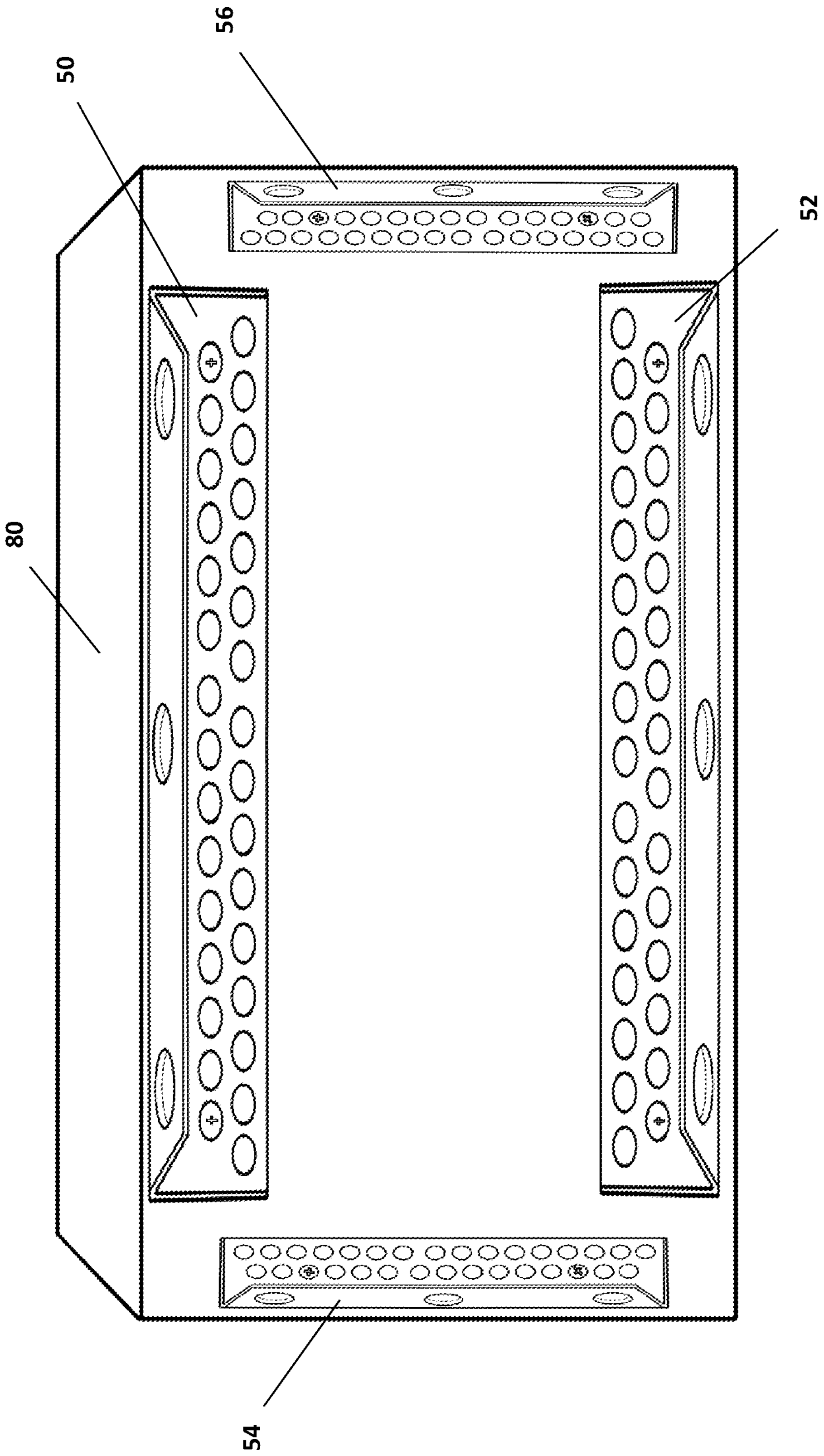
FIG. 3 is a three-dimensional view of the microwave oven mounting brackets, according to an embodiment of the present invention, shown attached to the rear side of a microwave oven.

FIG. 3 is a three-dimensional view of the microwave oven mounting brackets 50, 52, 54, 56, according to an embodiment of the present invention, shown attached to the rear side of a microwave oven 80. This drawing illustrates the upper, lower, left, and right mounting brackets 50, 52, 54, 56 bolted to the rear side of a microwave oven's 80 upper, lower, left and right sides, respectively. The screw holes located on the mounting brackets align with the screw holes located on the rear side of the microwave oven 80 and the mounting brackets 50, 52, 54, 56 are secured onto the microwave oven 80 via bolting.

Figure 4:
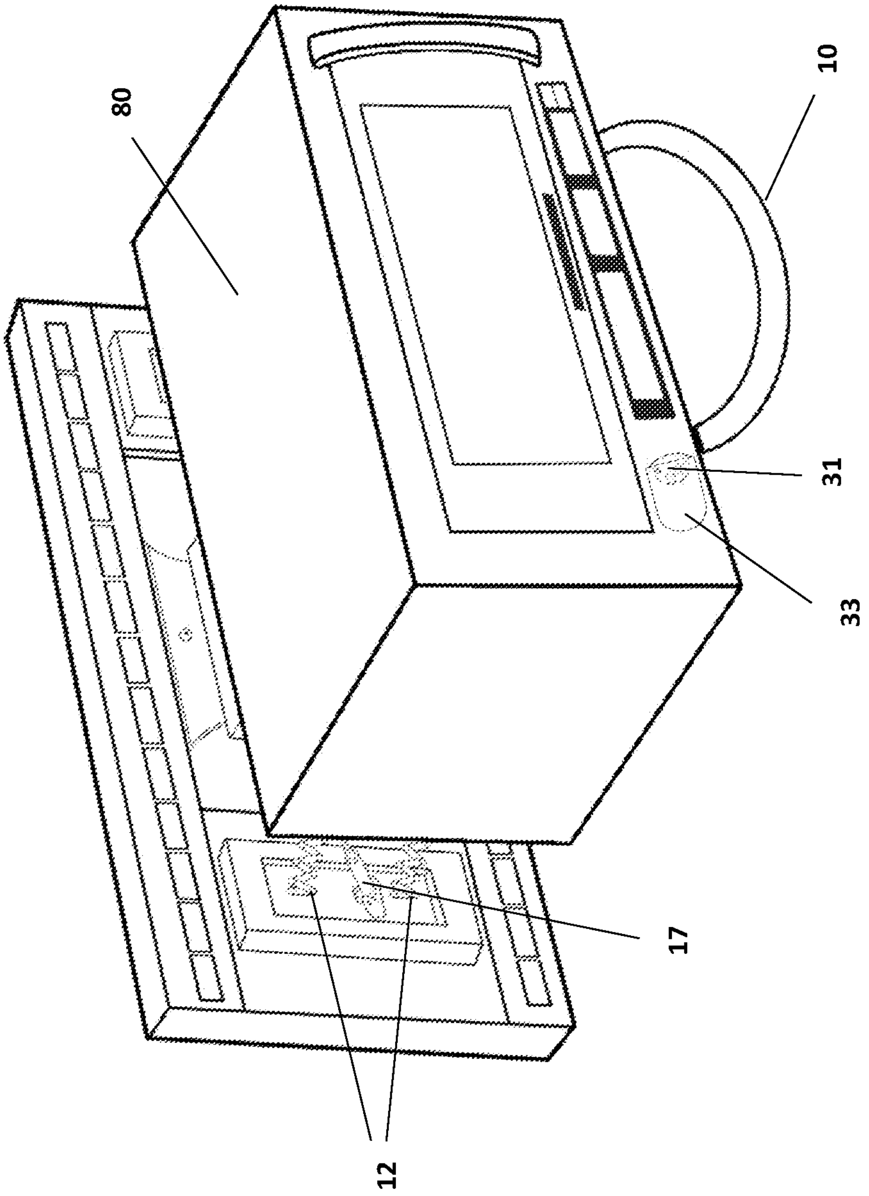
FIG. 4 is a three-dimensional view that depicts an adjustable microwave oven mounting apparatus, according to an embodiment of the present invention, with a microwave oven attached.

FIG. 4 is a three-dimensional view that depicts an adjustable microwave oven mounting apparatus, according to an embodiment of the present invention, with a microwave oven 80 attached. In this view, the rear side of an over-the-range microwave oven 80 is bolted to the adjustable microwave oven mounting apparatus. This figure depicts the remote control pouch 33 attached to the lower, front side of a microwave oven, whereas the remote control 31 is positioned inside the remote control pouch 33. Ideally, the remote control pouch 33 can attach to a microwave oven 80 and other surfaces using Velcro. Moreover, this drawing illustrates the pull handle 10 attached underneath the front portion of a microwave oven 80. The pull handle 10 is shown moving away from the wall. To manually maneuver a microwave oven 80, the user would grasp the pull handle 10 and pull in the desired direction. Therefore, as the pull handle 10 is pulled away from the wall, it causes the actuators 17 and the scissor hinges 12 to move away from the wall as well, thereby moving the microwave oven 80 in the same direction. As the microwave oven 80 is pulled away from the wall, the user can use the pull handle 10 to raise or lower a microwave oven 80, which causes the actuators 17 and the scissor hinges 12 to extend in the desired direction. Conversely, as the pull handle 10 is pulled towards the wall, the actuators 17 and the scissor hinges 12 contracts, thereby moving a microwave oven 80 towards the wall as well. Moreover, when the pull handle 10 is in a fully contracted configuration, the pull handle 10 is not in use and contracts towards the bottom of a microwave oven 80, thereby lying flat underneath a microwave oven 80.

Figure 5:
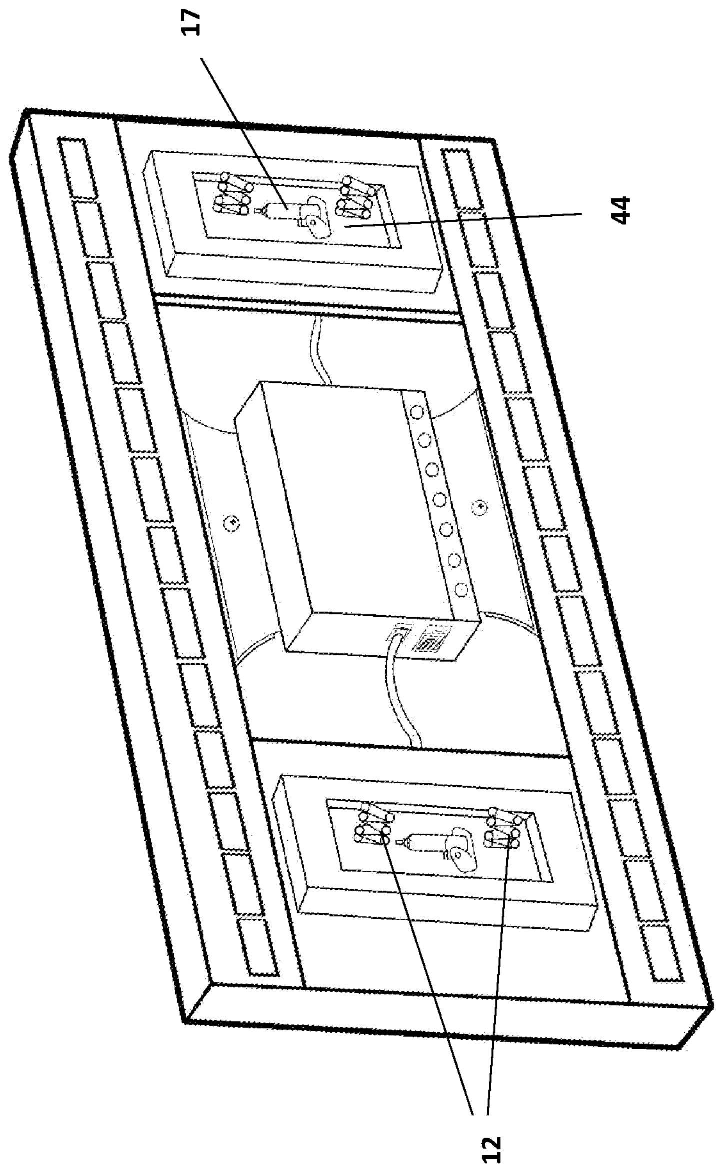
FIG. 5 is a three-dimensional partial view of an adjustable microwave oven mounting apparatus, according to an embodiment of the present invention, showing the extending/contracting components in a contracted configuration.

FIG. 5 is a three-dimensional partial view of an adjustable microwave oven mounting apparatus, according to an embodiment of the present invention, showing the extending components in a contracted configuration. This is seen whenever the mounting apparatus is not in use and the extending components, specifically the actuators 17 and the scissor hinges 12, return towards the wall in a compacted position. For this to occur, the user would use the wireless remote control 31 or an internet enhanced device to send commands to the controller 26 for the actuators 17 along with the scissor hinges 12 to contract back towards the wall, which would then cause the microwave oven to move towards the wall in its initial position. In this contracted configuration, the rods of the actuators 17 are fully compacted back into the actuators and then move into an upright position, and into their hollowed compartments 44. As the actuators 17 contract fully, the scissor hinges 12 also contract fully and are compacted back towards the wall, into their hollowed compartments 44 as well, since the actuators 17 guides the direction of the scissor hinges 12.

Figure 6:
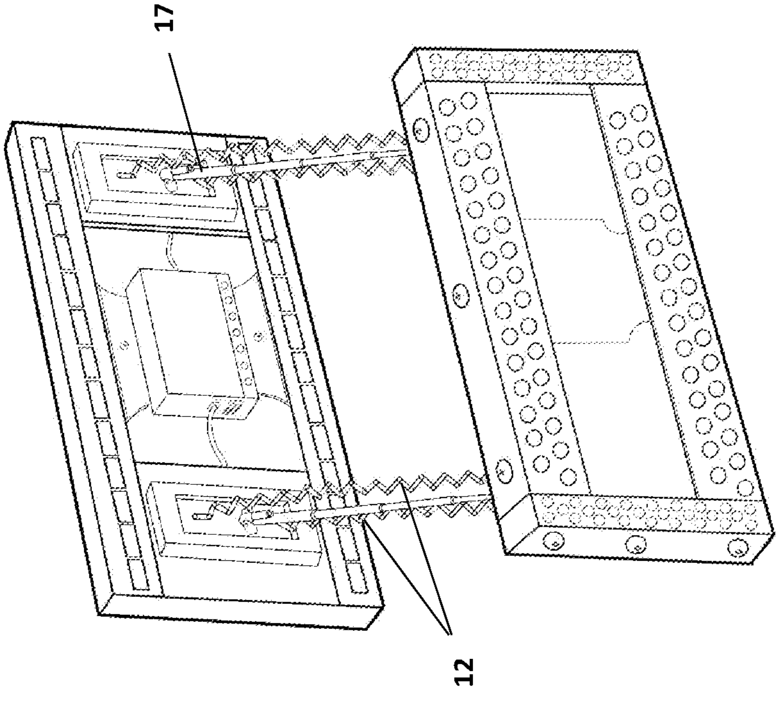
FIG. 6 is a three-dimensional view of an adjustable microwave oven mounting apparatus, according to an embodiment of the present invention, in a lowered configuration.

FIG. 6 is a three-dimensional view of an adjustable microwave oven mounting apparatus, according to an embodiment of the present invention, in a lowered configuration. In this drawing, the actuators 17 and the scissor hinges 12 are extended downward, which in turn, lowers the adjustable microwave oven mounting apparatus, to which a microwave oven will attach and also be lowered from its initial wall position. The Clevis fastener system 14, 16, 18 allows the actuators 17 to pivot downward, and the actuators 17 are then extended out their compacted rods which lowers the adjustable microwave oven mounting apparatus, and thus a microwave oven. Moreover, as the actuators 17 pivot downward, they move out of their hollowed compartments 44, away from the wall, guiding the scissor hinges 12 in the same direction. The actuators 17, along with the scissor hinges 12, force the mounting segment, and thus a microwave oven, away from the wall to avoid colliding with obstacles, such as colliding with the top of a range or stove, which is typically positioned directly below an over-the-range microwave oven.

Users who are short in statue or those who find it difficult to reach a microwave oven at higher levels, such as with an over-the-range microwave oven, can benefit from the adjustable microwave oven mounting apparatus by using this apparatus to lower the microwave oven at a more convenient level for the user to reach and operate more comfortably. The user would simply use the remote control 31 or an internet enhanced device to send commands to the controller 26 to lower the microwave oven mounting segment, which, in turn, lowers a microwave oven to a desired level for optimal user access.

Figure 7:
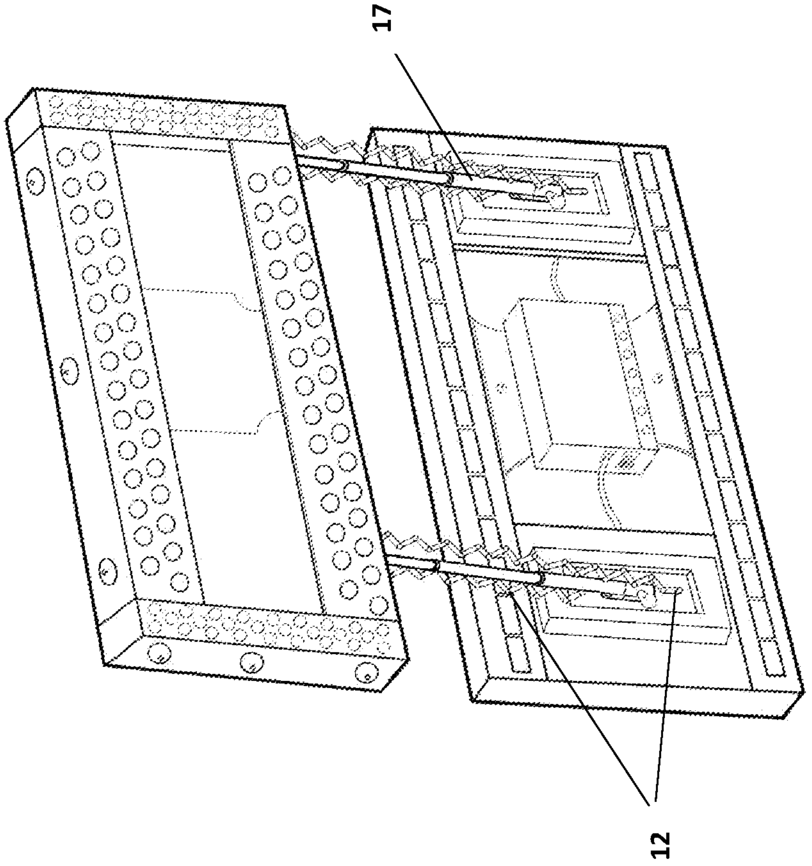
FIG. 7 is a three-dimensional view of an adjustable microwave oven mounting apparatus, according to an embodiment of the present invention, in a raised configuration.

FIG. 7 is a three-dimensional view of an adjustable microwave oven mounting apparatus, according to an embodiment of the present invention, in a raised configuration. In this configuration, the actuators 17 and the scissor hinges 12 are extended upward, which in turn, raises the adjustable microwave oven mounting apparatus, as depicted in the drawing, and thus a microwave oven. As the actuators 17 pivots away from the wall and out of their hollowed compartments 44, guiding the scissor hinges 12 in the same direction, their compacted rods extend out in multiple stages to raise the mounting segment, and thereby a microwave oven. Furthermore, the pivoting and extending features of the actuators 17 and scissor hinges 12 help the microwave oven to avoid colliding with obstacles while being raised. To exemplify, when the adjustable microwave oven mounting apparatus raises a microwave oven located under a kitchen counter, the apparatus can maneuver a microwave oven out from under the kitchen counter and then raise a microwave oven to avoid colliding with the kitchen counter.

Users who have microwave ovens located in relatively low positions, such as underneath a kitchen countertop, may find it difficult to stoop or reach below to operate or to clean a microwave oven. Using the remote control 31 or an internet enhanced device to raise the adjustable microwave oven mounting apparatus, and thus a microwave oven, to a higher level will provide the user with better access to the microwave oven.

Detailed Description of Selected Alternatives and Variations of the Invention FIG. 8 is a diagram of a three-dimensional structure of an alternative embodiment of the present subject matter. This alternative embodiment consists of the same extending and wall mounting segments as with the preferred embodiment of the present disclosure. However, in this embodiment the microwave oven mounting segment differs from that of the preferred embodiment of the present disclosure, in that the mounting segment is one component comprised of two aspects: a mounting bracket 40 and a mounting shelf 45. In this alternative embodiment, the mounting bracket 40 is a one-piece component consisting of numerous screw holes that are aligned around the mounting bracket 40. These screw holes are used to attach the mounting bracket 40 on the rear side of a microwave oven. The extending/contracting segment (specifically the actuators 17 and scissor hinges 12) in this embodiment would be connected to the rear side of the mounting bracket 40 to maneuver the mounting bracket 40 and, thus, an attached microwave oven.

The second aspect of the microwave oven mounting segment is the mounting shelf 45 that attaches underneath a microwave oven and serves a shelf to help support a microwave oven. This mounting shelf 45 aspect has an opening in its midst, namely the mounting shelf cavity 48, which serves as an access point to a microwave oven's operating systems, such as the ventilation, filtration, and lighting systems. Basically, the mounting shelf cavity 48 ensures that the usage of these vital operating systems, which are typically located underneath a microwave oven, are not restricted. Moreover, in this alternative embodiment, the pull handle 40 is attached underneath the mounting shelf 45 aspect instead of underneath a microwave oven as in the preferred embodiment of the disclosed subject matter.

FIG. 9 is a diagram of a three-dimensional structure of an alternative embodiment of the microwave oven mounting brackets as described in the preferred embodiment of the present subject matter. In this drawing, the mounting bracket is a one-piece component consisting of numerous screw holes that are aligned around the mounting bracket. These screw holes are used to attach the mounting bracket on the rear side of a microwave oven. The extending/contracting segment (specifically the actuators 17 and scissor hinges 12) in this embodiment would be connected to the rear side of the mounting bracket to maneuver the mounting bracket and, thus, an attached microwave oven. In this embodiment, the microwave oven mounting plate 25, as described in the preferred embodiment of the present disclosure (as seen FIGS. 1 and 2), is eliminated.

FIG. 10 is a diagram of a three-dimensional structure of an alternative embodiment of the microwave oven mounting brackets as described in the preferred embodiment of the present subject matter. In this drawing, all four mounting brackets 50, 52, 54, 56 as described in the preferred embodiment of the present subject matter are combined into one component. This one-piece mounting bracket attaches to the rear side of a microwave oven and then is bolted onto all four sides of the mounting plate 25 as described in the preferred embodiment of the present disclosure.

FIG. 11 is a diagram of a three-dimensional structure of an alternative embodiment of the microwave oven mounting segment as described in the preferred embodiment of the present subject matter. In this drawing, all four mounting brackets 50, 52, 54, 56 as described in the preferred embodiment of the present subject matter are combined into one component. The microwave oven mounting plate 25, as described in the preferred embodiment of the present disclosure, would be eliminated in this embodiment, and this one-piece mounting bracket includes a solid plate located on its rear side. The extending/contracting segment (specifically the actuators 17 and scissor hinges 12) as described in the preferred embodiment of the present disclosure would attach to the rear side of this one-piece mounting bracket, more specifically, to the rear side of its solid plate. This one-piece mounting bracket attaches to the rear side of a microwave oven. Additionally, the screw holes used for bolting to the microwave oven mounting plate 25, as described in the preferred embodiment of the present, would be eliminated since the mounting plate 25 would be eliminated in this alternative embodiment.

FIG. 12 is a diagram of a three-dimensional structure of an alternative embodiment of the microwave oven mounting brackets as described in the preferred embodiment of the present subject matter. In this drawing, all four mounting brackets are broader and larger in size and, therefore, encompass more screw holes than the four mounting brackets 50, 52, 54, 56 described in the preferred embodiment of the present subject matter. This alternative embodiment would also increase the compatibility of the adjustable microwave oven mounting apparatus with virtually all microwave ovens. The mounting plate 25 would remain the same as described in the preferred embodiment of the present subject matter. However, another option is creating a broader mounting plate for better compatibility for these alternative mounting brackets.

FIG. 13 is a diagram of a three-dimensional structure of an alternative embodiment of the microwave oven mounting brackets as described in the preferred embodiment of the present subject matter. In this drawing, the microwave oven mounting bracket is a broad one-piece component that consists of numerous screw holes. This alternative mounting bracket attaches to the rear side of a microwave oven and then attaches to the upper and lower sides of the mounting plate 25 as described in the preferred embodiment of the present subject matter.

FIG. 14 is a diagram of a three-dimensional structure of an alternative embodiment of the microwave oven mounting brackets as described in the preferred embodiment of the present subject matter. In this drawing, the mounting bracket is a broad one-piece component that consists of numerous screw holes. This alternative mounting bracket attaches to the rear side of a microwave oven and then attaches to the left and right sides of the mounting plate 25 as described in the preferred embodiment of the present subject matter.

FIG. 15 is a diagram of a three-dimensional structure of an alternative embodiment of the microwave oven mounting brackets as described in the preferred embodiment of the present subject matter. This alternative embodiment is similar to the four mounting brackets 50, 52, 54, 56 as described in the present subject matter, except in this embodiment, all four mounting brackets are adjustable and have the ability to be extend and contract. In this drawing, all four mounting brackets are shown partially extended. Because of their adjustable feature, these adjustable mounting brackets will also have a compatible alternative of the mounting plate 25, as described in the preferred embodiment of the present subject matter. FIG. 17 depicts this alternative embodiment of the mounting plate, known as the adjustable mounting plate.

FIG. 16 is a diagram of a three-dimensional structure of an alternative embodiment of the microwave oven mounting brackets as described in the preferred embodiment of the present subject matter. In this drawing, all four mounting brackets 50, 52, 54, 56, as described in the preferred embodiment of the present subject matter, are combined into one component, capable of extending and contracting all four of its sides. In this drawing, all four sides of this mounting bracket are shown partially extended. Because of its adjustable feature, the adjustable mounting bracket will also have a compatible alternative of the mounting plate 25, as described in the preferred embodiment of the present subject matter. FIG. 17 depicts this alternative embodiment of the mounting plate, known as the adjustable mounting plate.

FIG. 17 is a diagram of a three-dimensional structure of an alternative embodiment of the microwave oven mounting plate as described in the preferred embodiment of the present subject matter. This alternative embodiment is similar to the microwave oven mounting plate 25, as described in the preferred embodiment of the present subject matter, except in this embodiment, all four of its sides are capable of extending and contracting. In this drawing, all four sides of this one-piece adjustable microwave oven mounting plate are shown partially extended. Because of its adjustable feature, this alternative embodiment would be compatible with the four-piece adjustable mounting brackets and the one-piece adjustable mounting bracket, as described in FIG. 15 and FIG. 16.

FIG. 18 is a diagram of a three-dimensional structure of an alternative embodiment of the microwave oven mounting brackets as described in the preferred embodiment of the present subject matter. In this drawing, all four mounting brackets 50, 52, 54, 56 as described in the preferred embodiment of the present subject matter are combined into one component, capable of extending and contracting all four of its sides. The microwave oven mounting plate 25, as described in the preferred embodiment of the present disclosure, would be eliminated in this embodiment, and this one-piece adjustable mounting bracket includes a solid plate located on its rear side. The extending/contracting segment (specifically the actuators 17 and scissor hinges 12) as described in the preferred embodiment of the present disclosure would attach to the rear side of this one-piece adjustable mounting bracket, more specifically, to the rear side of its solid plate. This adjustable mounting bracket would attach to the rear side of a microwave oven. Additionally, the screw holes used for bolting to the microwave oven mounting plate 25, as described in the preferred embodiment of the present, would be eliminated since the mounting plate 25 would be eliminated in this alternative embodiment.

FIG. 19 is a three-dimensional structure of an alternative embodiment of the preferred embodiment of the present subject matter, which consists of two additional components. In this figure, the two components shown that function as a gliding system for the adjustable microwave oven mounting apparatus. This gliding system allows the disclosed invention to maneuver a microwave oven away from and towards a wall, while providing additional support in upholding a microwave oven. One of the components of this gliding system is a gliding plate 90 that consists of screw holders 92 aligned down its center. The gliding plate 90 also consists of two wing aspects that contains a screw hole located on each wing. Ideally, these wings are used to bolt the gliding plate 90 to an upper kitchen cabinet or to a surface. There is also a third screw hole located towards the end of gliding plate that is optional to use in securing the gliding plate to an upper cabinet or to a surface via bolting. Additionally, the gliding plate 90 has the capability to extend or contract. In this drawing, the gliding plate 90 is shown partially extended.

The second component of the gliding system is a self-aligning machine screw 95 which fastens on the top of a microwave oven with its lower portion, then enters into the front end of the gliding plate 90 and slides or glides down the center of the gliding plate 90 with its upper portion (located just below its screw head). The screw holders 92 located on the gliding plate 90 are separated by openings that allows the self-aligning machine screw 95 to slide or glide down the center of the gliding plate 90 and then locks into the position of the preferred screw holder 92. As desired, the self-aligning machine screw 95 can also attach to other areas of the microwave oven.

Additional Alternatives and Variations of the Invention

It should be understood that the disclosed invention may be practiced without all the specific details. It should also be understood that the preferred embodiment of the present disclosure that is described herein may consist of alternatives, variations, and changes that do not depart from the scope of the invention.

The implicated material that the present invention, including its alternatives and variations, is to be made up of is reinforced steel. However, there can be a variety of other materials that can substitute for the reinforced steel, which includes but is not limited to other alloy types (i.e., metal, aluminum, stainless steel, galvanized steel, bronze, nickel, brass, alloy steel, superalloy, chromium, beryllium, copper, iron, etc.), plastic, acrylic, wood, clay, silicone, fiberglass, etc. or a material that has the strength to uphold a microwave oven.

As described in this document, the implicated material for the pull handle is thermoplastic polyphthalamide (PPA, a high-performance polyamide), reinforced with fiberglass, capable of withstanding high heat temperatures. However, there can be a variety of other alternative materials that can be used, such as, but not limited to, other alloy types (i.e., metal, aluminum, stainless steel, galvanized steel, bronze, nickel, brass, alloy steel, superalloy, chromium, beryllium, copper, iron, etc.), plastic, acrylic, wood, clay, silicone, fiberglass, etc., or a material that is heat resistant.

The present invention, including its alternatives and variations, can use other material to allow each aspect of the disclosed subject matter to attach to another aspect of the present invention or to another object that includes, but not limited to, adhesives, magnetism, suctioning, fasteners, anchors, welding, tape, brazing, soldering, etc.

The steps, methods, sizes, shapes, measurements, positions, arrangements, and orientation of the present invention, including its alternatives and variations, can be adjusted as necessary or as desired, which include but are not limited to the addition or elimination of certain aspects of the disclosed subject matter. For example, the actuators could be eliminated in the present invention and the scissor hinges could be the primary extending component. Moreover, the pull handle could be positioned on the left or right side of a microwave oven or onto any other feasible area on the microwave oven. The pull handle could also attach to the adjustable microwave oven mounting apparatus, including its alternatives and variations.

Though the adjustable microwave oven mounting apparatus is created to fit virtually any microwave oven, manufacturers of microwave ovens, certified carpenters, and other skilled technicians could also add more screw holes to the rear of a microwave oven to be more compatible with and able to attach to the adjustable microwave oven mounting apparatus. Furthermore, the screw holes positioned on the present invention, including its alternatives and variations, can also be repositioned, or more can added or subtracted to accommodate virtually any microwave oven.

The disclosed subject matter, including its alternatives and variations, can be controlled or operated manually or remotely by using mechanisms that can control the movement or operation of an object, including, but not limited to, wired and wireless sources, etc. Electricity is the power source of the present disclosure. Alternatively, other energy sources can be substituted for and work in conjunction with the electrical power source, which include, but are not limited to solar power, renewable energy, hydropower, wind power, etc.

Additionally, the extending/contracting segment (i.e., actuators, scissor hinges, Clevis pin, etc.) depicted in describing the embodiment of the present invention can be substituted for and work in conjunction with other types of engineering mechanisms, including, but not limited to, cylinders, actuators (including smart actuators), robotic arms, robotic mechanisms, articulating arms, cams and followers, gears and gear trains, belts and chains, pulleys, wheels and axles, levers, ratchets, and springs, linkages, universal joint, gliding mechanisms, fasteners, etc. The present invention could also use these engineering mechanisms (actuators, robotic arms, etc.) in any combination to maneuver the adjustable microwave oven mounting apparatus, and thus a microwave oven, in virtually any direction, including but not limited to, having the capability to tilt and rotate. One example on how this can be accomplished is by substituting the present invention's extending/contracting segment with an articulating arm, a robotic arm, or an articulated robot mechanism, wherein using these mechanisms can provide a 360-degree movement feature for optimal user access. Moreover, all aspects of the invention, including its alternatives and variations, could also be engineered to be adjustable, including but not limited to, having the features of being able to contract and to extend.

Manufactures of microwave ovens or other qualified technicians could also update the microwave oven to include a built-in remote control or a technology that can work with smart home automation systems or internet enhanced devices.

The power cord on microwave ovens may be too short to extend out and move in higher and lower directions. Some solutions in resolving this issue could include, but are not limited to:

- Using a suitable electrical outlet extender, adapter, power hub, etc.
- Manufacturers of microwave ovens could update their methods and practices to include creating longer cords when manufacturing future microwave ovens.
- Manufacturers of microwave ovens (or other manufacturers, companies, individuals, etc.) could create longer compatible cords for all microwave ovens as a separate part or an additional accessory for users to purchase to switch to or upgrade their microwave ovens.
- Alternatively, the present invention could include a compatible outlet wherein the power cord to an attached microwave oven can plug into in an effort to eliminate the distance of the power cord having to extend out from the wall outlet. Installing an outlet on the invention may include updating its power capabilities to one that is able to provide sufficient power to the adjustable microwave oven mounting apparatus and to also power the usage in operating a microwave oven.

As described in this document, the present disclosure can also be used to mount displays. These displays include but are not limited to, electronics (i.e., televisions, theater projectors, whiteboards, computers, computer screens, etc.), portraits, frames, etc.

It should be understood that while the preferred embodiment of the invention is described in some detail herein, the present disclosure is made by way of example only and that alternatives, variations, and changes that are possible without departing from the subject matter. However, for the sake of brevity, this document only includes selected alternatives of the present invention.

What is claimed is:

1. An adjustable apparatus comprising: a wall mounting segment configured to attach to a wall or a support surface;
- a microwave oven mounting segment configured to attach to a microwave oven;
- an extending/contracting segment between the wall mounting segment and the microwave oven mounting segment, said extending/contracting segment comprising a minimum of one actuator and a pair of scissor hinges, wherein, when the wall mounting segment is mounted, the actuator and said pair of scissor hinges are configured to allow vertical and horizontal movement of the microwave oven mounting segment, wherein the pair of scissor hinges being positionable in inclined and declined configuration;
- a wireless remote control;
- a controller secured on a central portion of the wall mounting segment and configured to control the operation of the extending/contracting segment, wherein,
- the controller reads commands received by the wireless remote control, said controller then sends a signal to the actuator to permit the operation of the actuator, in conjunction with the pair of scissor hinge; and
- a pull handle configured to attach on a lower portion of the microwave, said pull handle configured to manually control the operation of the extending/contracting segment.

2. The adjustable apparatus as in claim 1, wherein the wall mounting segment comprising a minimum of one hollowed compartment, said hollowed compartment configured to store the actuator and the pair of scissor hinges.

3. The adjustable apparatus as in claim 1, wherein the microwave oven mounting segment comprising a microwave oven mounting plate and a minimum of one microwave oven mounting bracket, wherein, the microwave oven mounting bracket is attached to the microwave oven mounting plate.

4. The adjustable apparatus as in claim 1, wherein the pair of scissor hinges configured to move in parallel operation and in differential operation of the actuator, said pair of scissor hinges having opposite end portions that are pivotably coupled between said wall mounting segment and said microwave oven mounting segment to permit movement of said microwave oven mounting segment relative to said wall mounting segment.

5. The adjustable apparatus as in claim 1, wherein the wireless remote control comprising a remote control pouch configured to store the remote control, said remote control pouch optionally attaches to the microwave oven or to other surfaces.

6. The adjustable apparatus as in claim 1, wherein the controller further comprising an electronic system, said controller configured to be used in smart home automation, wherein, the controller controls the operation of the extending/contracting segment using internet enhanced devices.

7. A kit for mounting a microwave comprising:
- a wall mounting segment;
- a microwave oven segment;
- an extending/contracting segment;
- a wireless remote control;
- a controller; and
- a pull handle; wherein
- said wall mounting segment configured to attach to a wall or a support surface;
- said microwave oven mounting segment configured to attach to a microwave oven;
- said extending/contracting segment between the wall mounting segment and the microwave oven mounting segment, said extending/contracting segment comprising a minimum of one actuator and a pair of scissor hinges, wherein, when the wall mounting segment is mounted, the actuator and said pair of scissor hinges are configured to allow vertical and horizontal movement of the microwave oven mounting segment, wherein the pair of scissor hinges being positionable in inclined and declined configuration;
- said controller secured on a central portion of the wall mounting segment and configured to control the operation of the extending/contracting segment, wherein, the controller reads commands received by the wireless remote control, said controller then sends a signal to the actuator to permit the operation of the actuator, in conjunction with the pair of scissor hinge; and
- said pull handle configured to attach on a lower portion of the microwave, said pull handle configured to manually control the operation of the extending/contracting segment.

8. The adjustable apparatus as in claim 7, wherein the microwave oven mounting segment further comprising a mounting bracket and a mounting shelf.

9. The adjustable apparatus as in claim 8, wherein the microwave oven mounting segment further comprising a mounting shelf cavity configured to access the microwave oven's user interface or operating systems.

10. The adjustable apparatus as in claim 7, wherein the pull handle configured to attach to the microwave oven mounting segment.

11. An adjustable apparatus comprising: a wall mounting segment configured to attach to a wall;

a microwave oven mounting segment configured to attach to a microwave oven;

an extending/contracting segment between the wall mounting segment and the microwave oven mounting segment, said extending/contracting segment comprising a minimum of one actuator and a pair of scissor hinges, wherein, when the wall mounting segment is mounted, the actuator and said pair of scissor hinges are configured to allow vertical and horizontal movement of the microwave oven mounting segment, wherein the pair of scissor hinges being positionable in inclined and declined configuration;

a wireless remote control;

a controller secured on a central portion of the wall mounting segment and configured to control the operation of the extending/contracting segment, wherein, the controller reads commands received by the wireless remote control, said controller then sends a signal to the actuator to permit the operation of the actuator, in conjunction with the pair of scissor hinge; and a pull handle configured to attach to a shelf configured to support the microwave, said pull handle configured to manually control the operation of the extending/contracting segment.

12. The adjustable apparatus as in claim 11, wherein the microwave oven mounting segment configured to extend and contract vertically and horizontally.

13. The adjustable apparatus as in claim 11, further comprising a gliding system, said gliding system configured to move the microwave oven away from or towards the wall or the support surface, said gliding system provides additional support for the microwave oven, said gliding system configured to extend and contract.

14. The adjustable apparatus as in claim 13, wherein the gliding system further comprising a gliding plate and a self-aligning machine screw, said gliding plate attaches to an upper kitchen cabinet or the support surface and said self-aligning machine screw attaches to the microwave oven, wherein the self-aligning machine screw configured to move across the gliding plate for moving the microwave away from and towards the wall or other support surface.

* * * * *